United States Patent [19]
Henneberger

[11] Patent Number: 5,316,243
[45] Date of Patent: May 31, 1994

[54] OPTIC CABLE MANAGEMENT

[75] Inventor: Roy Henneberger, Eagan, Minn.

[73] Assignee: ADC Telecommunications, Inc., Minneapolis, Minn.

[21] Appl. No.: 984,246

[22] Filed: Nov. 30, 1992

Related U.S. Application Data

[63] Continuation of Ser. No. 678,131, Apr. 1, 1991, abandoned, which is a continuation-in-part of Ser. No. 387,978, Jul. 31, 1989, Pat. No. 5,067,678.

[51] Int. Cl.$^5$ .............................................. H02G 3/04
[52] U.S. Cl. .................................. 248/68.1; 248/49; 248/58
[58] Field of Search ................ 248/68.1, 49, 221.3, 248/58

[56] References Cited

U.S. PATENT DOCUMENTS

| | | | |
|---|---|---|---|
| 3,042,351 | 7/1967 | DuBois | 248/49 X |
| 3,351,699 | 11/1967 | Merckle | 248/68.1 X |
| 4,570,437 | 2/1986 | Moritz | 248/49 X |
| 4,658,577 | 4/1987 | Klein | 248/49 X |
| 5,067,678 | 11/1991 | Henneberger et al. | |

FOREIGN PATENT DOCUMENTS

| | | | |
|---|---|---|---|
| 83809 | 7/1983 | European Pat. Off. | 248/49 |
| 315023 | 5/1989 | European Pat. Off. | 248/49 |
| 2119631 | 9/1971 | Fed. Rep. of Germany | 248/49 |
| 2358863 | 11/1973 | Fed. Rep. of Germany | 248/49 |
| 1479341 | 5/1967 | France | 403/329 |
| 1503965 | 10/1967 | France | 248/68.1 |

*Primary Examiner*—Alvin C. Chin-Shue
*Attorney, Agent, or Firm*—Merchant, Gould, Smith, Edell, Welter & Schmidt

[57] ABSTRACT

A cable routing system is disclosed that includes a plurality of cable pathway-defining elements, including troughs and fittings. Each of the elements terminates at an attachment end. A coupling is provided for adjoining at least a first one of the attachment ends to at least a second one of the attachment ends. The coupling includes an alignment mechanism for aligning the first and second ends in a predetermined alignment. The coupling further includes a clamp mechanism for clamping of the attachment ends within the coupling when the attachment ends are in the predetermined alignment.

5 Claims, 9 Drawing Sheets

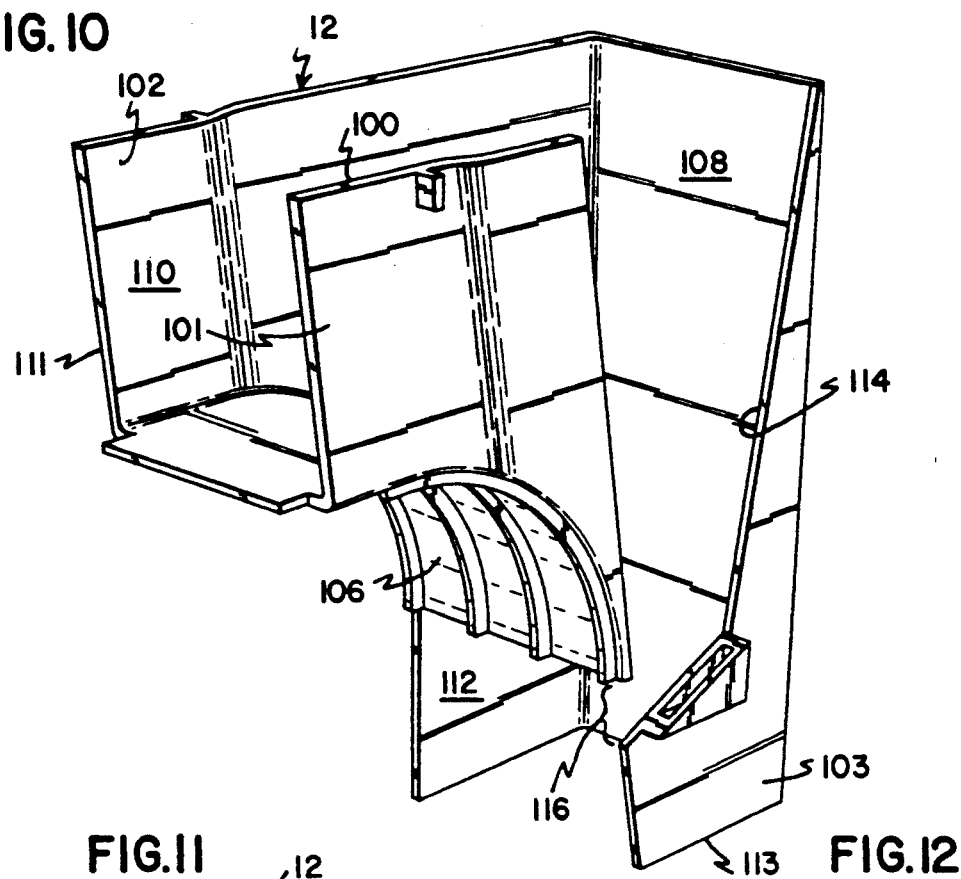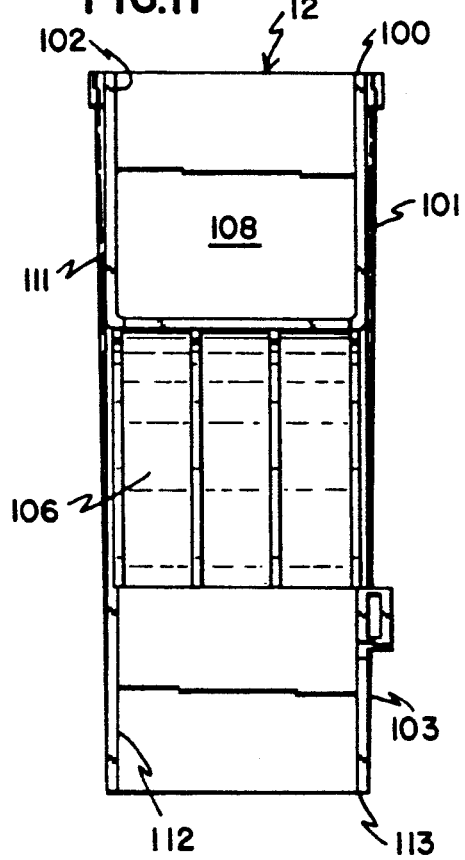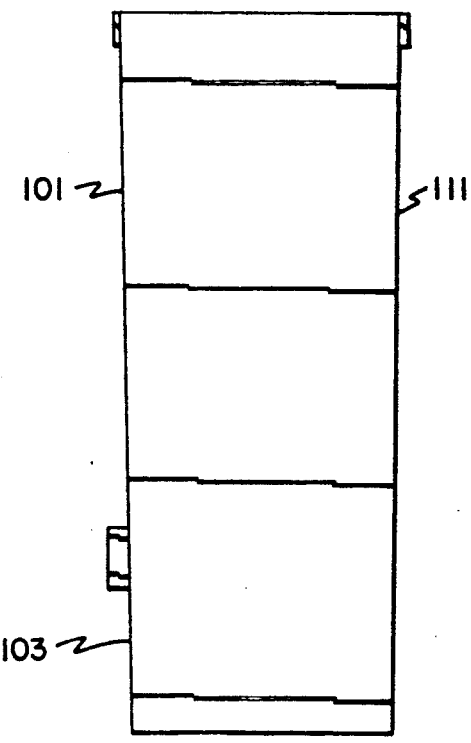

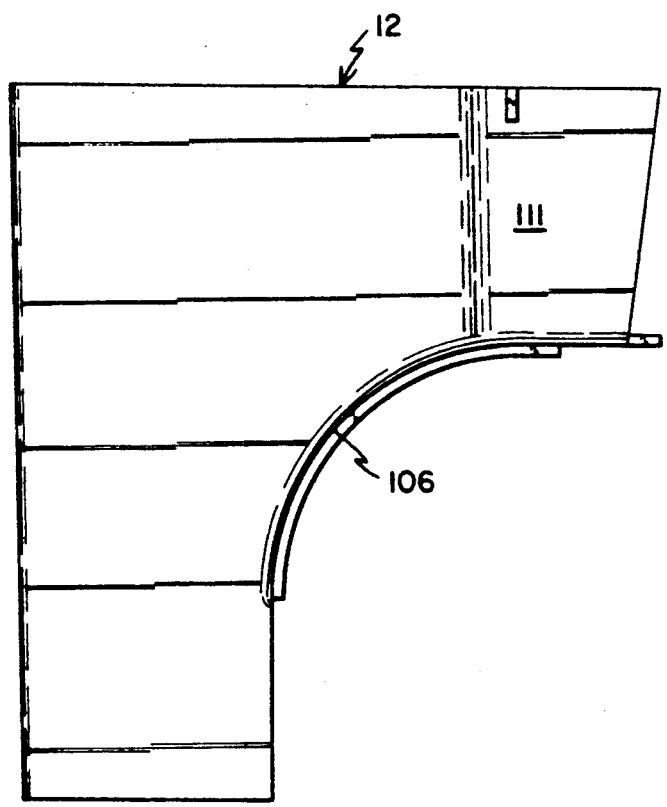
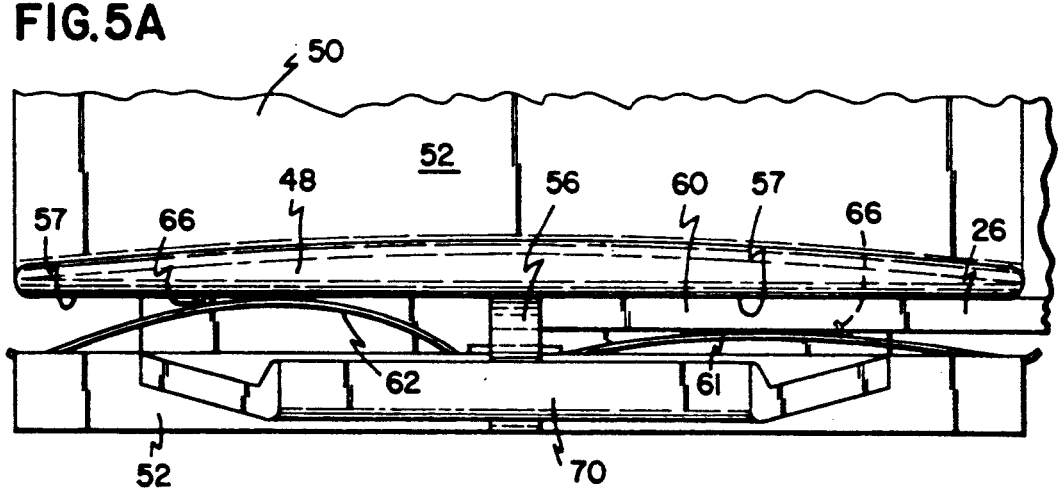

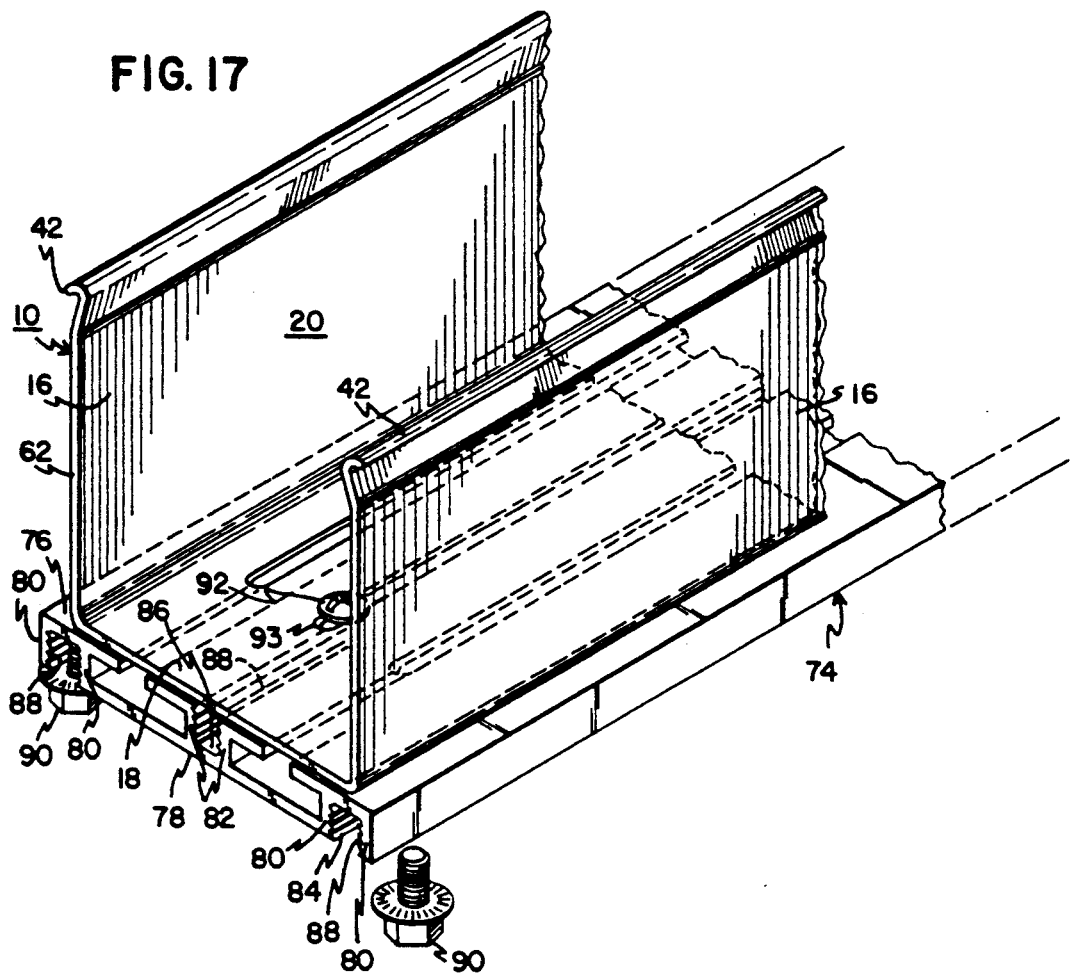
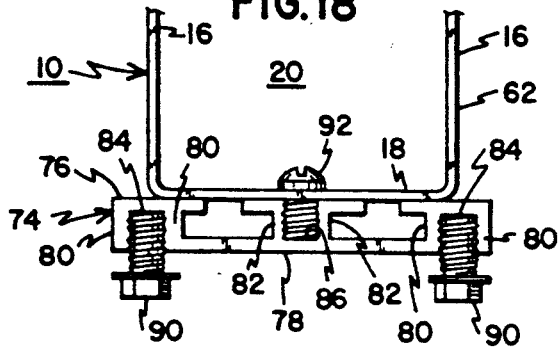

5,316,243

OPTIC CABLE MANAGEMENT

CROSS-REFERENCE TO RELATED PATENT APPLICATION

The present application is filed as a continuation-in-part of U.S. patent application Ser. No. 07/387,978 filed Jul. 31, 1989, U.S. Pat. No. 5,067,678 issued Nov. 26, 1991, and entitled "Optic Cable Management System", and a continuation of application Ser. No. 07/678,131, filed Apr. 1, 1991, abandoned.

BACKGROUND OF THE INVENTION

1. Field of the Invention

This application pertains to a system for the management and routing of optical fiber cables. More particularly, this application pertains to an optical fiber routing system which is easily modified and which includes a novel coupling for joining troughs and fittings.

2. Background of the Invention

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly, a routing system is not practical that would require a high capital outlay and that could not be readily adapted to changes in a customer's needs. Namely, if routing paths, once established, are forever fixed, the system cannot adapt. Also, and perhaps most importantly, any routing system must protect optical fibers from damage. In the use of optical fibers, it is recognized that the fibers should not be bent beyond a minimum radius of curvature. For example, it is commonly recognized that optical fibers should not be bent in a radius of less than 1.5 inches.

The aforementioned U.S. patent application Ser. No. 07/387,978 teaches an optic cable management system which includes a plurality of troughs and fittings. The troughs are extruded such that they can be cut to any length and present the same attachment end. The present invention pertains to an improved coupling for use in a system such as that shown in Ser. No. 07/387,978 and additional improvements to such a system.

SUMMARY OF THE INVENTION

According to a preferred embodiment of the present invention, a cable routing system is disclosed for routing optical fiber cables between optical transmission equipment. The system includes a plurality of cable pathway-defining elements, including a plurality of troughs and fittings. Each one of the plurality of elements terminates at an attachment end. A novel coupling is described for joining at least a first one of said attachment ends to at least a second one of said attachment ends. A novel coupling includes an alignment means for aligning the first and second attachment ends in a predetermined alignment. Clamp means are provided for automatically clamping the attachment ends to the coupling upon alignment.

DESCRIPTION OF THE DRAWINGS

FIG. 5A is an enlarged view of one side of the coupling shown in FIG. 5 with a side wall of an attached fitting shown inserted only in the right side of the coupling;

FIG. 10 is a perspective view of a horizontal-to-vertical transition fitting;

FIG. 11 is a front end view of the fitting of FIG. 10;

FIG. 12 is a rear end view of the fitting of FIG. 10;

FIG. 16 is a left side elevation view of the fitting of FIG. 10;

FIG. 17 is a perspective view of a fiber trough attached to a rigid support member; and FIG. 18 is a front elevation view of the view of FIG. 17.

DESCRIPTION OF THE PREFERRED EMBODIMENT

Figure 1:
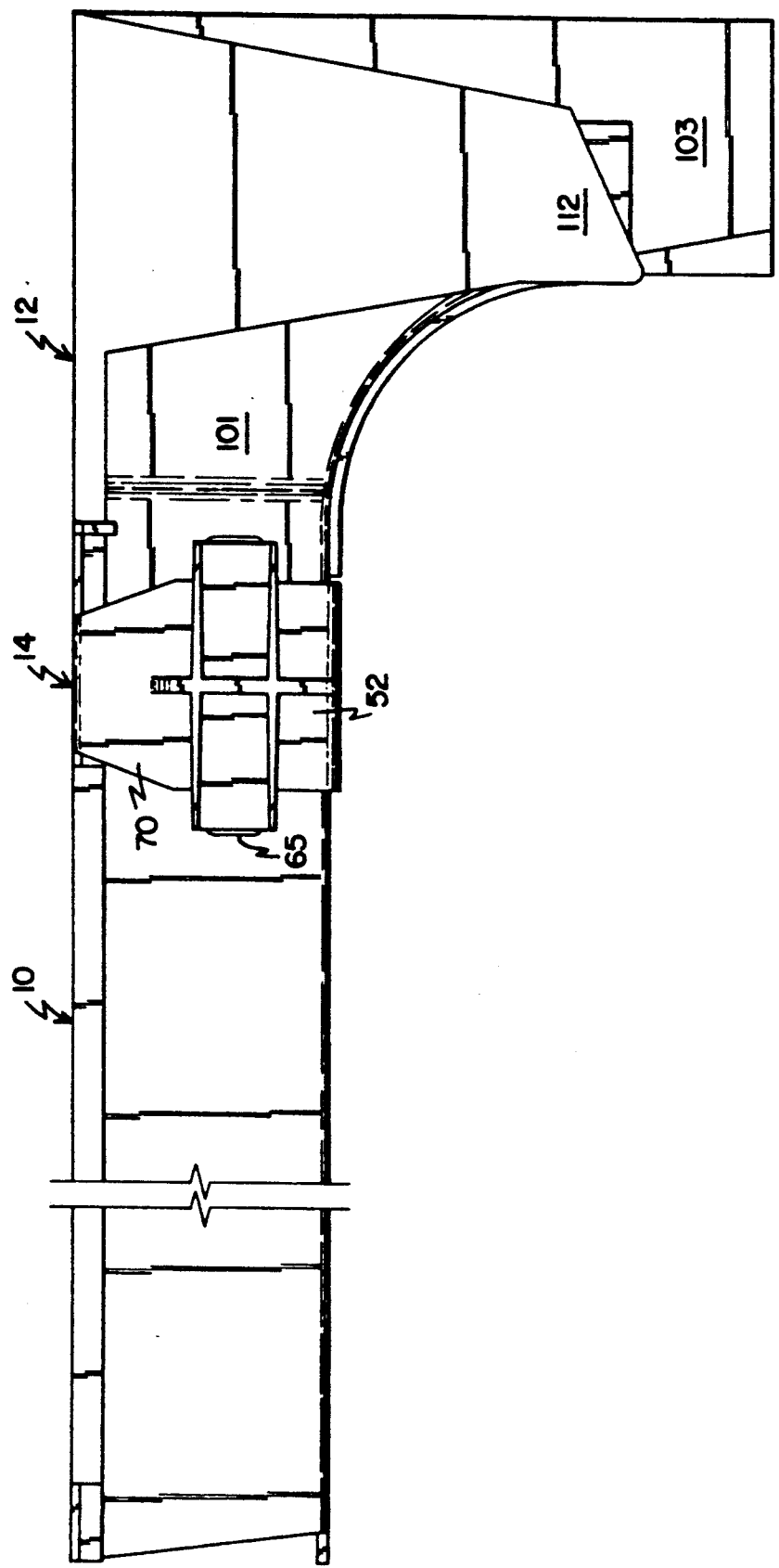
FIG. 1 is a side elevation view of a portion of a cable management system including a cable trough coupled to a horizontal-to-vertical transition fitting.
Figure 2:
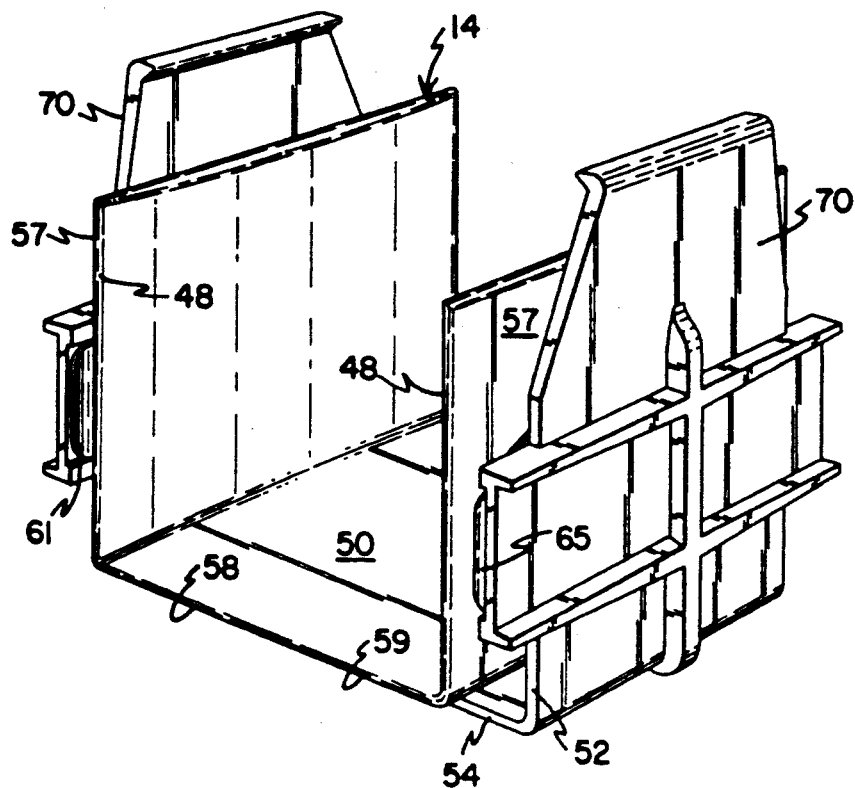
FIG. 2 is a perspective view of a coupling for joining fittings and troughs of the cable management system.
Figure 3:
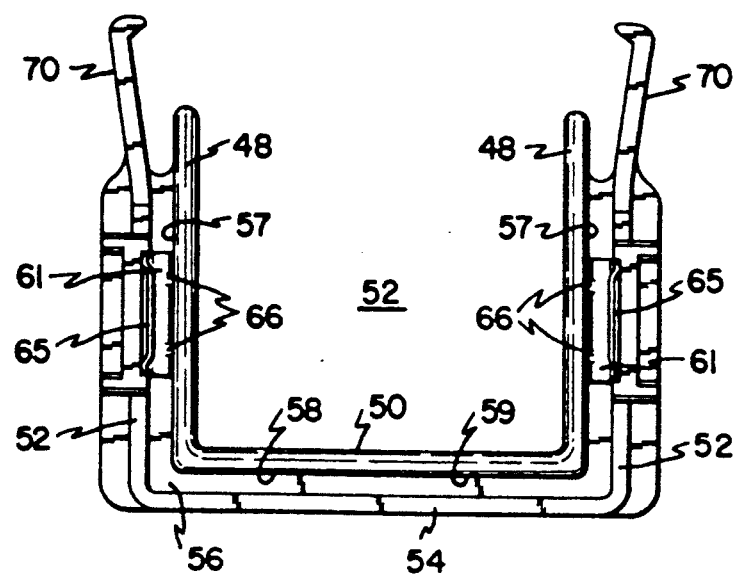
FIG. 3 is a side elevation view of the coupling of FIG. 2.

Referring now to the several drawing figures in which identical elements are numbered identically throughout, an optical fiber cable routing system is disclosed. The system may include a plurality of elements, including a plurality of troughs 10 which may be connected to a plurality of fittings (such as horizontal-to-vertical transition fitting 12). Couplings 14 are provided for joining troughs together, fittings together, or for joining troughs to fittings.

Each of the troughs is formed from extruded plastic. A trough is partially shown in FIG. 17 as including generally vertical side walls 16 joined by a horizontal bottom wall 18. The walls 16, 18 cooperate to define a trough interior 20. The interior 20 functions as a cable pathway through which optical fiber cables may travel.

Figure 4:
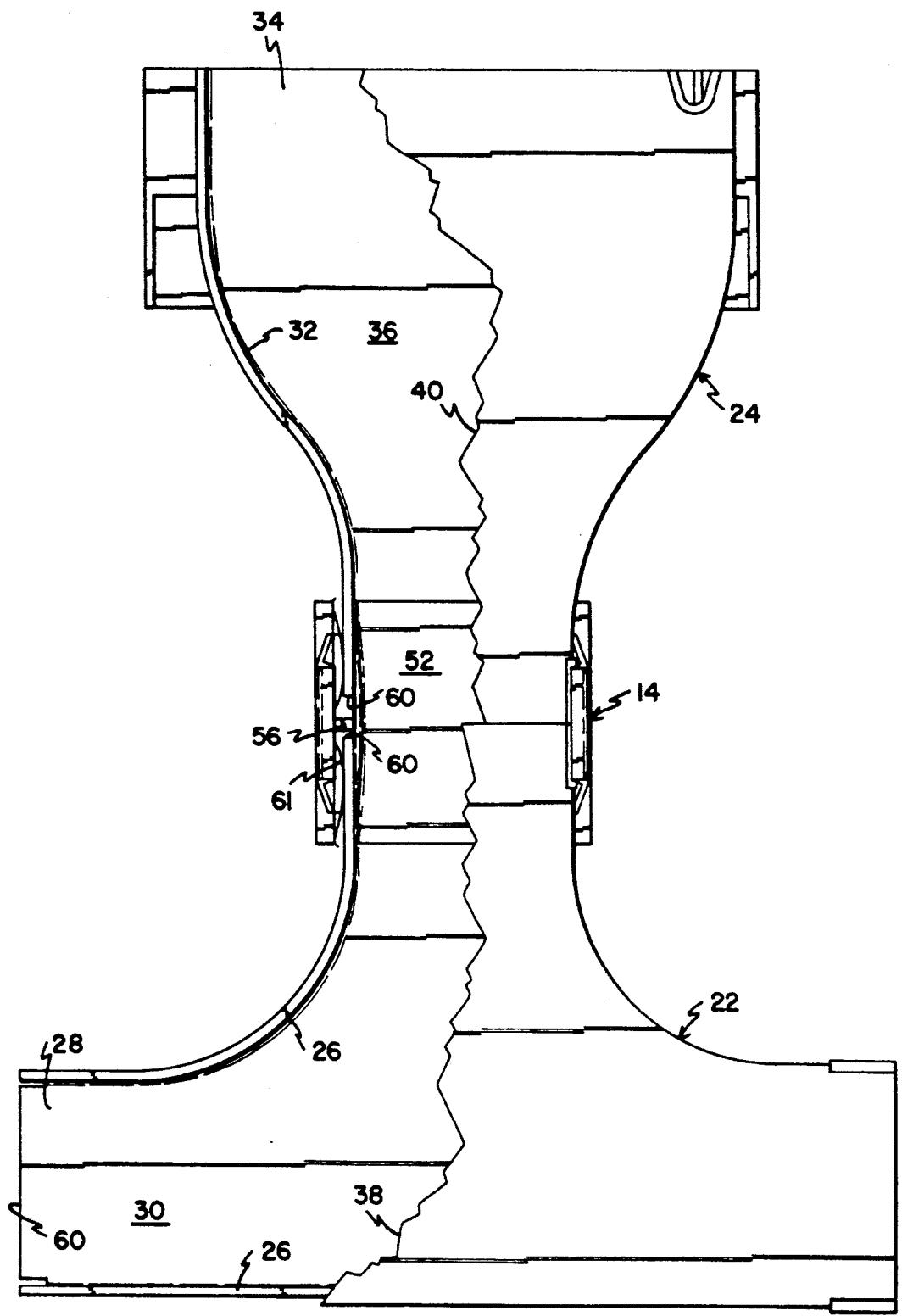
FIG. 4 is a top plan view of two fittings being joined by the coupling of FIG. 2, with covers of the fittings being partially exposed.
Figure 5:
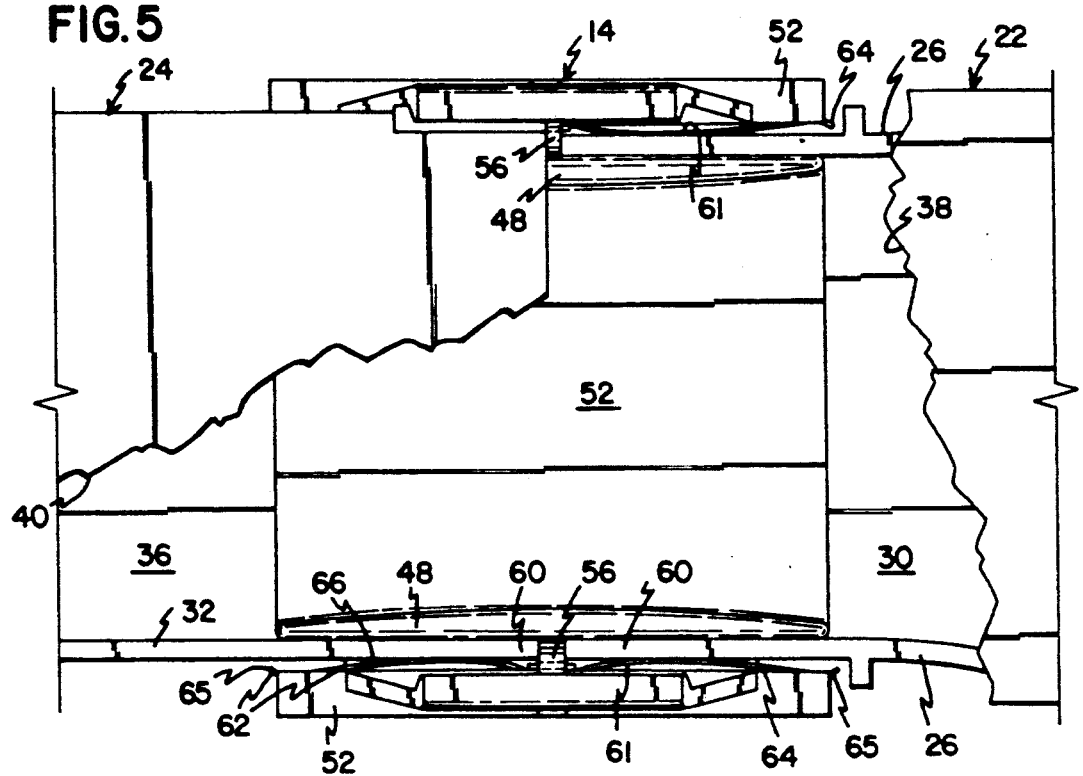
FIG. 5 is an enlarged view of the coupling of FIG. 4.

In addition to the troughs 10 defining pathways 20, various fittings can define pathways. For example, FIG. 4 shows a T-fitting 22 connected to a reducing fitting 24 by means of a coupling 14.

Fitting 22 includes side walls 26 and bottom wall 28, which define a fitting cable pathway 30. Similarly, fitting 24 includes side walls 32 and bottom wall 34, which define the cable pathway 36.

Figure 6:
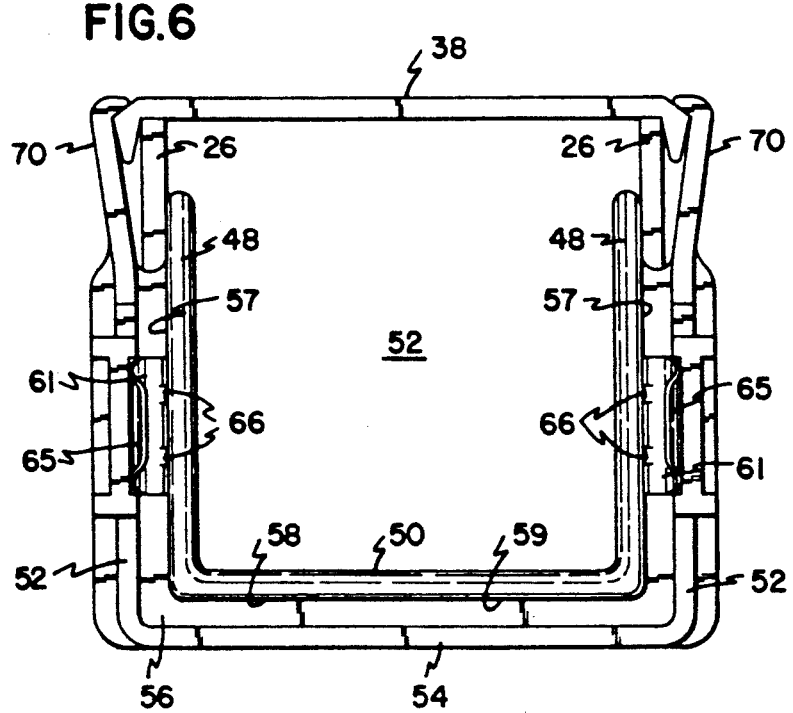
FIG. 6 is an end view of a coupling having one fitting attached and with a fitting lid in place.
Figure 7:
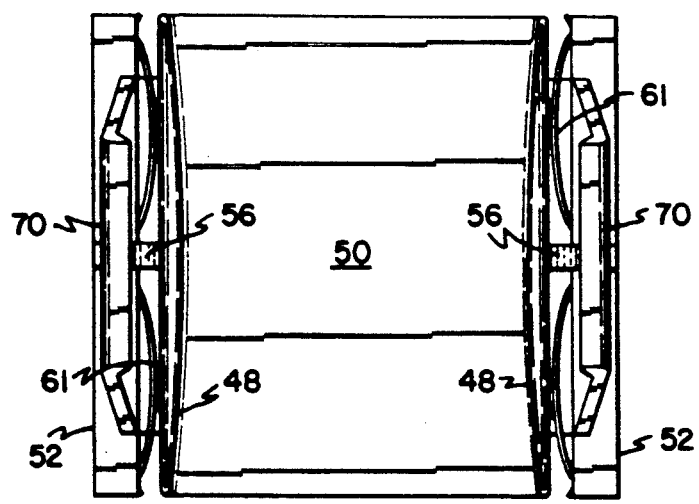
FIG. 7 is a top plan view of the coupling of FIG. 2.
Figure 8:
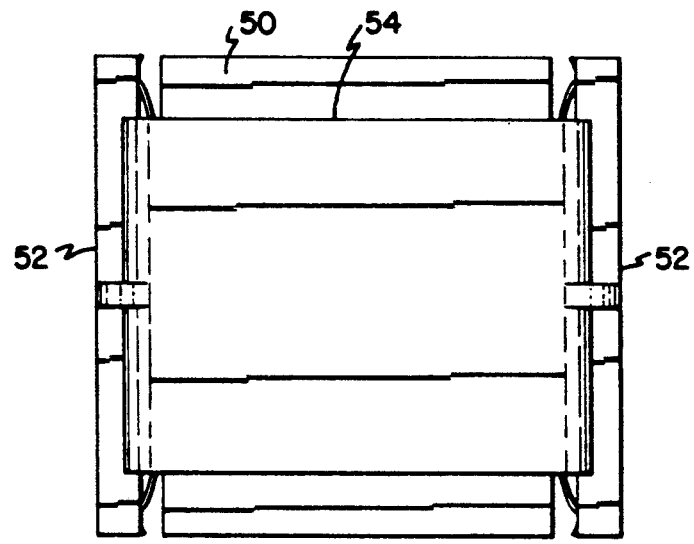
FIG. 8 is a bottom plan view of the coupling of FIG. 2.
Figure 9:
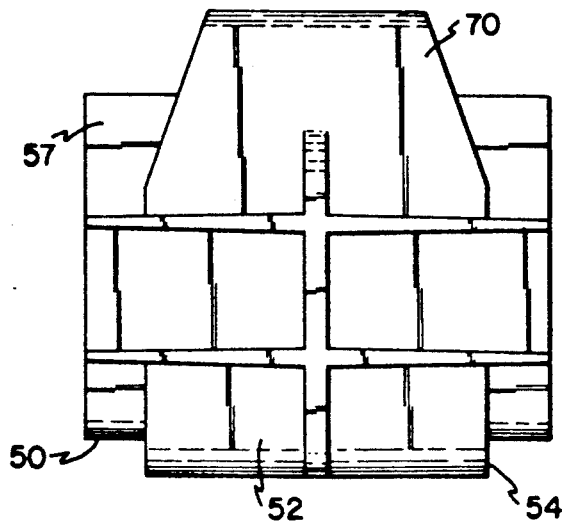
FIG. 9 is a side elevation view of the coupling of FIG 2.
Figure 13:
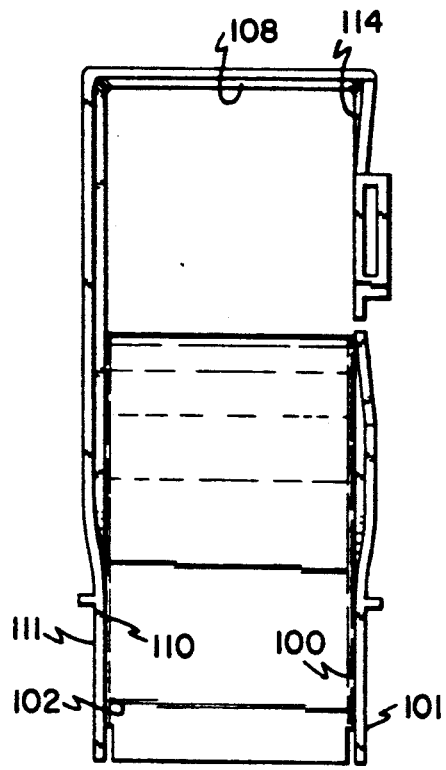
FIG. 13 is a top plan view of the fitting of FIG. 10.
Figure 14:
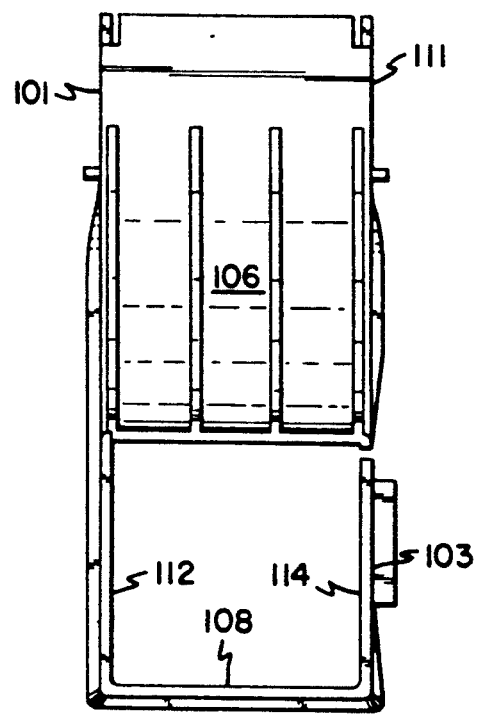
FIG. 14 is a bottom plan view of the fitting of FIG. 10.
Figure 15:
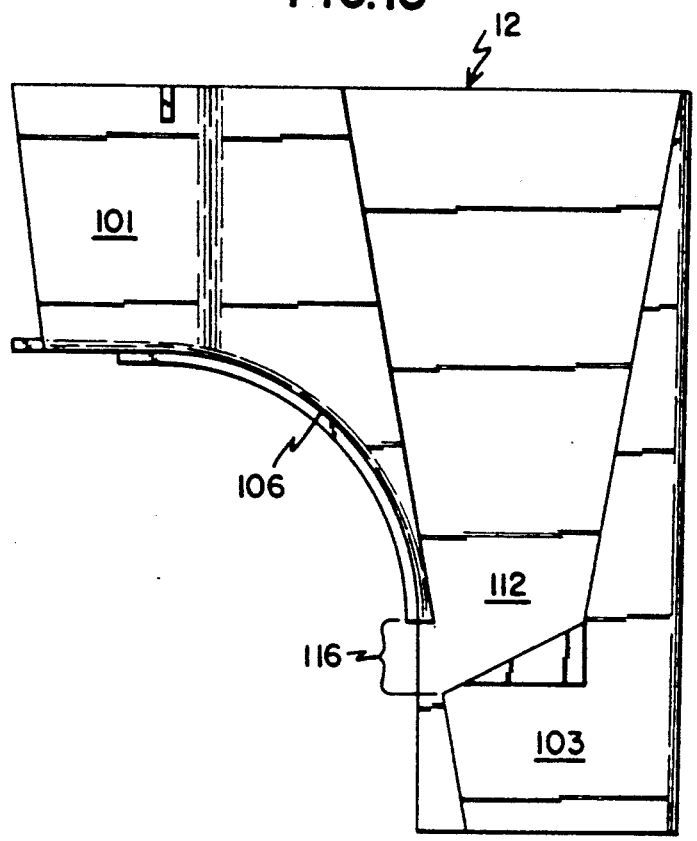
FIG. 15 is a right side elevation view of the fitting of FIG. 10.

Lids 38, 40 are provided for covering pathways 30, 36 and may be snapped on to the side walls 26. For example, FIG. 6 shows a lid 38 connected to the side walls 26 of T-fitting 22. Further, the side walls 16 of troughs 10 may be provided with clip ends 42 (see FIG. 17), which may be used to snap on to lids (not shown) of the troughs 10.

It will be appreciated that an optic cable management system having troughs and fittings forms no part of this invention per se. Such a system is shown in my commonly assigned and copending U.S. patent application Ser. No. 07/387,978 filed Jul. 31, 1989. The present invention pertains to various improvements to such a system, including a novel coupling mechanism for quick-coupling troughs and fitting.

With best reference to FIGS. 1-9, a novel coupling 14 is shown in detail. The coupling 14 includes both alignment and clamping features.

Coupling 14 includes internal side walls 48 and internal bottom wall 50. Side walls 48 and bottom wall 50 cooperate to define a cable pathway 52. The coupling 14 also includes outer side walls 52, joined by an outer bottom wall 54. Side walls 52 and bottom wall 54 are retained in spaced parallel relation to side walls 48, 50 by a centrally disposed spacing rib 56. The walls 48, 50 and 52, 54 cooperate to define a generally U-shaped space 58, which includes side wall spaces 57 and bottom wall space 59 sized to receive bottom and side walls, respectively, of fittings and troughs.

Each of the troughs 10 and fittings (such as fittings 22, 24, or 12) terminate at attachment ends. The attachment ends of the fittings are shown generally at 60 (e.g., see FIG. 4). The attachment end of the trough is shown generally at 62 in FIG. 17. The attachment ends have generally the same U-shaped configuration and dimensions such that the attachment ends may be received within spaces 58. For example, a trough 10 may be attached to coupling 14 by slidably locating bottom wall 18 and side wall 16 into spaces 59, 57, respectively. Similarly, fitting 22 can be received within coupler 14, with side walls 26 received within space 57 and with bottom wall 28 received within space 59. Any other fittings may be received within coupling with the side walls of the fittings received within space 57 and with the bottom walls of the fittings received within space 59.

The receipt of the attachment ends within the coupling 14 results in alignment of couplings and troughs connected to fitting 14. For example, with reference to FIG. 4, with attachment ends 60 received within opposite sides of the coupling 14, cable receiving pathway 30 is in communication with cable-receiving pathway 36 via pathway 52. With the attachment of FIG. 1, the cable-receiving pathway of the trough 10 is connected to the cable-receiving pathway of the fitting 12.

In addition to aligning fittings or troughs, the coupling 14 attaches to the attachment ends of the fittings and troughs to securely receive the attachment ends within the coupling 14. Shown best in FIGS. 5-7, leaf springs 61 are carried by the coupling 14, with the leaf springs 61 placed within side space 57 on opposite sides of the coupling 14.

As shown best in FIG. 5A, the leaf springs 61 include first and second halves 62, 64 disposed on opposite sides of spacing rib 56. (In FIG. 5A, side wall 32 is removed.) The springs 62, 64 are biased toward internal walls 48. The springs have terminal ends 65, which are bent back to permit a leading end of the attachment ends to be inserted within the space 57. Upon sliding of the attachment ends into the space 58, the leading ends of the walls 26 force the springs away from walls 48.

The springs 61 are metallic and include cutout tabs 66, which project toward walls 57 and are angled into the direction of spacing wall 56. The tabs 66 act as knife edges, which cut into the plastic of a trough or a fitting wall (such as walls 26 in FIGS. 5 and 5A) to bite into the walls 26 and prevent the walls 26 from being drawn out of the coupling 14. As a result, the clamping means not only includes the spring bias to hold fittings or troughs within the coupling 14. Instead, the clamping also includes the knife action of tabs 66 to bite into the material of the fittings or troughs to retain the fittings or troughs securely within the coupling 14.

Clips 70 extend upwardly from side walls 52 and are sized to engage the roof of a lid 38 (such as that shown in FIGS. 5 or 6) to securely hold the lid 38 in place. The clips 70 are resilient and may be spaced apart to remove the lid 38.

In the present invention, there is also shown a novel support mechanism for supporting troughs 10. Accordingly, attention is now directed to FIGS. 17 and 18.

Each of the troughs 10 is extruded plastic and may be cut to its desired length. Regardless of where the cut is made, each of the troughs 10 presents an identical cross-sectional profile at the terminal end 62. Accordingly, no matter where the trough is cut, its terminal end 62 will be adequately shaped to be received within a coupling 14.

A rigid support plate 74 is provided to be received against the bottom or exterior surface of bottom wall 18. The plate 74 is preferably made from extruded metal (such as aluminum). The plate 74 includes an upper surface 76 and a bottom surface 78, with a plurality of rails joining the bottom to top surface, including outer rails 80 and inner rails 82. Rails 80 are spaced apart to define a longitudinally extending slot 84 opening through the bottom wall 78. Rails 82 are spaced apart to define longitudinally extending slot 86 opening through upper wall 76. Each of the opposing surfaces of rails 80 and 82 include internal grooves 88, which extend longitudinally. The grooves 88 are shaped to threadably receive the threads of standard bolts 90, 92.

The support 74 is extruded. As a result, no matter where it is cut, the same thread profile is presented. Therefore, bolts 90, 92 may be threadably received within slots 84, 86 at any location along the length of support structure 74. Slots 93 are formed in bottom wall 18 of trough 10 to be aligned with slot 86. As a result, trough 10 may be secured to support 74 by simply receiving a bolt 92 through the slots 93. Any rigid mounting bracket (not shown) may be connected to the support 74 by bolts 90 to secure the support 74 to a ceiling or other structure.

The vertical-to-horizontal transition fitting 12 is shown in detail in FIGS. 10-16. The fitting 12 includes right and left side walls 100, 102, respectively. Side wall 100 includes first and second portions 101, 103. The side walls 100, 102 are joined by a rear wall 104 and an arcuate bottom wall 106. Arcuate bottom wall 106 is selected to have a radius of curvature of not less than 1.5 inches to prevent damage to optical fibers lined against wall 106.

The walls 100, 102, 104, and 106 cooperate to define a cable pathway 108, including a horizontal pathway 110 and a vertical pathway 112 extending between attachment ends 111 and 113. Pathway 110 opens upwardly, and pathway 112 opens toward a side opposite back wall 108. A vertical slot 114 is provided through side wall 100 separating portion 101 from portion 103. The slot 114 permits placement of fibers within pathway 108. A gap 116 extends between side wall portions 101 and 103 such that a fiber may extend completely through pathway 112, gap 116, and slot 114.

With the structure of fitting 112 as described, a horizontal trough may be connected to end 111. A vertical trough may be connected to end 113 via coupling 14. The fibers from the horizontal trough may be connected to the fibers of the vertical trough by simply pulling the fibers through slot 114 and passing them through gap 116 to place them in the vertical pathway defined by the vertical trough.

From the foregoing detailed description of the present invention, it has been shown how the invention has been obtained in a preferred manner. However, modifications and equivalents of the disclosed concepts, such as those that readily occur to one skilled in the art, are intended to be included within the scope of this invention.

What is claimed is:

1. A cable routing system comprising:
   a plurality of cable pathway-defining elements;
   each one of said plurality terminating at least one attachment end and each of said elements including walls for defining a cable pathway;
   a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;
   said alignment means including first and second outer walls and first and second inner walls spaced from said first and second outer walls, respectively, by a distance to define first and second pockets, respectively, sized to receive said first and second sidewalls, respectively, of said elements, said inner and outer walls disposed for said elements to be in said predetermined alignment when said sidewalls are disposed between said outer and inner walls of said coupling; and
   said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between pathway-defining elements.

2. A system according to claim 1, wherein said spring means includes grip means for gripping a wall of said element within said coupling.

3. A cable routing system comprising:
   a plurality of cable pathway-defining elements;
   each one of said plurality terminating at least one attachment end;
   a coupling for joining at least a first one of said attachment ends to at least a second one of said attachment ends, said coupling including aligning means for aligning the first and second ones in a predetermined alignment, said coupling further including clamp means for automatically clamping an attachment end when in said predetermined alignment; and
   said plurality including a plurality of troughs and support means for supporting said troughs, said support means including a support plate having at least one longitudinally extending slot formed therein and opposing a trough, said longitudinally extending slot having longitudinally extending groove means for defining a plurality of opposing grooves on opposing sides of said slot, with said opposing grooves sized to threadably receive a threaded attachment member said slot extending substantially an entire length of said plate and said grooves extending substantially an entire length of said slot.

4. A system according to claim 6, wherein said support plate is extruded for said plurality of grooves to present a substantially identical profile along a length of said support member.

5. A cable routing system comprising:
   a plurality of cable pathway-defining elements;
   each one of said plurality terminating at least one attachment end;
   a coupling for joining at least a first one of said attachment ends to at least a second one of said attachment ends, said coupling including aligning means for aligning the first and second ones in a predetermined alignment, said coupling further including clamp means for automatically clamping an attachment end when in said predetermined alignment; and
   a horizontal-to-vertical transition fitting having walls including an arcuate bottom wall, first and second side walls (100, 102) disposed on opposite sides of said bottom wall and a generally vertical rear wall opposing said bottom wall and joining said side walls;
   said bottom, side and rear walls cooperating to define a cable pathway extending from a vertical pathway portion having an open vertical access (112) to a generally perpendicular horizontal pathway portion having an open horizontal access on a side of said bottom wall opposite said vertical access;
   a slot (116) formed through said second sidewall and said bottom wall for passing a fiber exterior of said fitting from said horizontal pathway to said vertical pathway, said slot extending completely from said vertical access to said horizontal access.

* * * * *

US005316243C1

(12) EX PARTE REEXAMINATION CERTIFICATE (5863rd)
United States Patent
Henneberger

(10) Number: US 5,316,243 C1
(45) Certificate Issued: Aug. 21, 2007

(54) OPTIC CABLE MANAGEMENT

(75) Inventor: Roy Henneberger, Eagan, MN (US)

(73) Assignee: ADC Telecommunications, Inc., Minneapolis, MN (US)

Reexamination Request:
No. 90/007,219, Sep. 22, 2004

Reexamination Certificate for:
Patent No.: 5,316,243
Issued: May 31, 1994
Appl. No.: 07/984,246
Filed: Nov. 30, 1992

Related U.S. Application Data

(63) Continuation of application No. 07/678,131, filed on Apr. 1, 1991, now abandoned, which is a continuation-in-part of application No. 07/387,978, filed on Jul. 31, 1989, now Pat. No. 5,067,678.

(51) Int. Cl.
*H02G 3/04* (2006.01)

(52) U.S. Cl. .......................... 248/68.1; 248/49; 248/58
(58) Field of Classification Search ....................... None
See application file for complete search history.

(56) References Cited

U.S. PATENT DOCUMENTS

| 2,360,159 | A | * | 10/1944 | Peck | ........................... 285/371 |
| 2,823,056 | A | | 2/1958 | Di Meo | |
| 3,370,121 | A | | 2/1968 | Merckle | |
| 3,457,598 | A | | 7/1969 | Mariani | |
| 3,836,181 | A | * | 9/1974 | Kelver | ........................ 285/55 |
| 3,875,618 | A | | 4/1975 | Schuplin | |
| 4,099,749 | A | | 7/1978 | Van Vliet | |
| 5,035,092 | A | | 7/1991 | Brant | |

FOREIGN PATENT DOCUMENTS

| DE | 3636412 A1 | 4/1988 |
| GB | 1342085 | 12/1973 |

OTHER PUBLICATIONS

"Defendant's Prior Art List" dated Oct. 1, 2001 in the action titled *ADC Telecommunications, Inc.* v. *Panduit Corp.*, Civil Action No. 01–CV–477 ADM/AJB. pp. 1, 6–13, 28–29.

"ADC's Discussion of Panduit's Prior Art List" dated Nov. 1, 2001 in the action titled *ADC Telecommunications, Inc.* v. *Panduit Corp.*, Civil Action No. 01–CV–477 ADM/AJB. pp. 1, 8–12, 23.

"Plaintiff's Supplemental (Jul. 26, 2001) Claim Chart" dated Jul. 26, 2001 in the action titled *ADC Telecommunications, Inc.* v. *Panduit Corp.*, Civil Action No. 01–CV–477 ADM/AJB. pp. 1, 3–6, 11 and attached Exhibits 1, 4 and 5.

"Plaintiff's Second Supplemental Claim Chart" dated Aug. 31, 2001 in the action titled *ADC Telecommunications, Inc.* v. *Panduit Corp.*, Civil Action No. 01–CV–477 ADM/AJB. pp. 1–6.

"Defendant's Claim Chart" dated Aug. 1, 2001 in the action titled *ADC Telecommunications, Inc.* v. *Panduit Corp.*, Civil Action No. 01–CV–477 ADM/AJB. pp. 1, 4–15, 47.

"Joint Claim Construction Statement" dated Dec. 21, 2001 in the action titled *ADC Telecommunications, Inc.* v. *Panduit Corp.*, Civil Action No. 01–CV–477 ADM/AJB. pp. 1, 3–8, 30–37, 47–48.

(Continued)

*Primary Examiner*—Matthew Graham

(57) ABSTRACT

A cable routing system is disclosed that includes a plurality of cable pathway-defining elements, including troughs and fittings. Each of the elements terminates at an attachment end. A coupling is provided for adjoining at least a first one of the attachment ends to at least a second one of the attachment ends. The coupling includes an alignment mechanism for aligning the first and second ends in a predetermined alignment. The coupling further includes a clamp mechanism for clamping of the attachment ends within the coupling when the attachment ends are in the predetermined alignment.

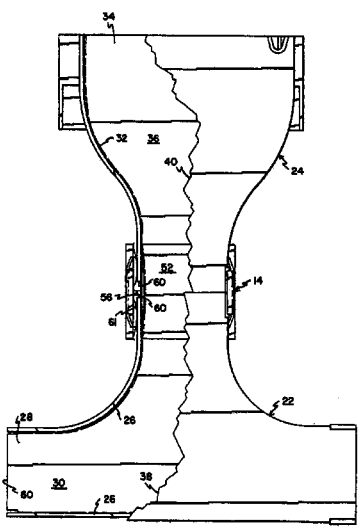

OTHER PUBLICATIONS

"Memorandum Opinion and Order" dated Apr. 24, 2002 by United States District Court Judge Ann Montgomery in the action titled *ADC Telecommunications, Inc. v. Panduit Corp.*, Civil No. 01–477 ADM/AJB, pp. 1–5, 7–14, 24.

"Memorandum Opinion and Order" dated Dec. 11, 2002 by United States District Court Judge Ann Montgomery in the action titled *ADC Telecommunications, Inc. v. Panduit Corp.*, Civil No. 01–477 ADM/AJB, pp. 1–3, 15–30, 35.

"Rebuttal Expert Report of Dr. Arthur G. Erdman" dated May 21, 2002 in the action titled *ADC Telecommunications, Inc. v. Panduit Corp.*, Civil Action No. 01–CV–477 ADM/AJB. pp. 1–16, 25.

"Supplemental Expert Witness Report of Larry S. Nixon Pursuant to Fed. R. Civ. P. Rule 26(a)(2)(B)" dated May 21, 2002 in the action titled *ADC Telecommunications, Inc. v. Panduit Corp.*, Civil Action No. 01–CV–477 ADM/AJB. pp. 1–18, 26–27.

"Expert Report of Glenn L. Beall" dated Apr. 13, 2002 in the action titled *ADC Telecommunications, Inc. v. Panduit Corp.*, Civil Action No. 01–CV–477 ADM/AJB. pp. 1–11.

"Expert Witness Report of Dr. Arthur G. Erdman" dated Apr. 22, 2002 in the action titled *ADC Telecommunications, Inc. v. Panduit Corp.*, Civil Action No. 01–CV–477 ADM/AJB. pp. 1–2, 6–12, 18 and Ex. D attached thereto.

"Expert Witness Report of Larry S. Nixon Pursuant to Fed. R. Civ. P. Rule 26(a)(2)(B)" dated Apr. 22, 2002 in the action titled *ADC Telecommunications, Inc. v. Panduit Corp.*, Civil Action No. 01–CV–477 ADM/AJB. pp. 1, 10–20, 36 and Attachment B thereto.

"Rebuttal Report of Glenn L. Beall" dated May 17, 2002 in the action titled *ADC Telecommunications, Inc. v. Panduit Corp.*, Civil Action No. 01–CV–477 ADM/AJB. pp. 1–10, 15.

"ADC's Markman Brief Regarding Claim Construction of U.S. Patent No. 5,316,243" dated Jan. 4, 2002 in the action titled *ADC Telecommunications, Inc. v. Panduit Corp.*, Civil Action No. 01–CV–477 ADM/AJB. title page, (i–iii), and pp. 1–36 (redacted).

"ADC's Brief in Opposition to Panduit's Motion for Summary Judgment of U.S. Patent No. 5,316,243" dated Jul. 1, 2002 in the action titled *ADC Telecommunications, Inc. v. Panduit Corp.*, Civil Action No. 01–CV–477 ADM/AJB, title page, (ii–v), and pp. 1–34 (redacted).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 and 5 is confirmed.

Claims 1 and 4 are determined to be patentable as amended.

Claim 2, dependent on an amended claim, is determined to be patentable.

New claims 6–127 are added and determined to be patentable.

1. A cable routing system comprising:
a plurality of cable pathway-defining elements;
each one of said [plurality] *elements* terminating *at* at least one attachment end and each of said elements including walls for defining a cable pathway *with an upper longitudinal opening through which cables can be added or removed from said cable pathway*;
a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;
said alignment means including first and second outer walls and first and second inner walls spaced from said first and second outer walls, respectively, by a distance to define first and second pockets, respectively, sized to receive said first and second sidewalls, respectively, of said elements, said *first and second* inner and outer walls disposed for said elements to be in said predetermined alignment when said sidewalls are disposed between said outer and inner walls of said coupling; and
said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between said pathway-defining elements.

4. A system according to claim [6] *3*, wherein said support plate is extruded for said plurality of grooves to present a substantially identical profile along a length of said support member.

6. *A cable routing system comprising:*
*a plurality of cable pathway-defining elements;*
*each one of said elements terminating at at least one attachment end and each of said elements including walls for defining a cable pathway with an upper longitudinal opening through which cables can be added or removed from said cable pathway;*
*a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;*
*said alignment means including first and second outer walls and first and second inner walls spaced from said first and second outer walls, respectively, by a distance to define first and second pockets, respectively, sized to receive said first and second sidewalls, respectively, of said elements, said first and second inner and outer walls disposed for said elements to be in said predetermined alignment when said sidewalls are disposed between said outer and inner walls of said coupling; said first and second outer walls including first and second outer bottom-wall portions respectively, said first and second inner walls including first and second inner bottom-wall portions respectively, said outer bottom-wall portions being spaced from said inner bottom-wall portions to receive therebetween a bottom-wall portion of said elements; and*
*said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between said pathway-defining elements.*

*7. The cable routing system of claim 6, further including a spacing rib between the attachment ends when the attachment ends are joined by the coupling, the spacing rib retaining the outer walls and the inner walls in their spaced relation when the attachment ends are joined by the coupling.*

*8. The cable routing system of claim 7, wherein the first and second spring means are first and second springs respectively, and wherein the first and second springs are biased meaning that the springs are in a slanted orientation so that when the element sidewalls are inserted into the pockets the first and second springs provide a force against the inserted element sidewalls, and wherein the springs are resiliently biased meaning that the springs will return toward an original position.*

*9. The cable routing system of claim 8, wherein, when in their original position, the first and second springs touch the first and second inner walls of the coupling.*

*10. The cable routing system of claim 8, wherein the first and second outer walls include sidewall portions that are continuous from a bottom of the coupling to a top of the coupling.*

11. The cable routing system of claim 8, wherein the first and second outer bottom-wall portions are continuous across a width of said coupling pathway.

12. The cable routing system of claim 11, wherein the first and second outer bottom-wall portions are continuous with the remainder of the first and second outer walls.

13. The cable routing system of claim 8, wherein said first and second outer walls include sidewall portions having stepped-out portions adjacent outer surfaces of said first and second springs and nonstepped-out portions positioned above or below said first and second springs, the stepped-out portions being spaced from the first and second inner walls a greater distance than said nonstepped-out portions to provide additional pocket space for holding said first and second springs.

14. The cable routing system of claim 13, wherein the stepped-out portions are continuous with the nonstepped-out portions.

15. The cable routing system of claim 13, wherein said stepped-out portions of said sidewall portions form a spring backing from which the first and second springs extend into the first and second pockets respectively.

16. The cable routing system of claim 15, wherein said first spring is a flexible metal arm that slants inwardly into the first pocket from a first end portion of the spring backing, and wherein said second spring is a flexible metal arm that slants inwardly into the second pocket from a second end portion of the spring backing.

17. The cable routing system of claim 16, wherein the first spring is a first arm of a leaf spring, and wherein the second spring is a second arm of said leaf spring.

18. The cable routing system of claim 15, wherein the spring backing includes reinforcing ribs.

19. The cable routing system of claim 18, wherein the reinforcing ribs comprise plastic material.

20. The cable routing system of claim 15, wherein the spring backing includes a top reinforcing rib along a top portion thereof and a bottom reinforcing rib along a bottom portion thereof.

21. The cable routing system of claim 15, wherein said spring backing is sized to cover the first and second springs thereby enclosing the first and second springs in the first and second pockets.

22. The cable routing system of claim 21, wherein the spring backing is continuous with the non-stepped out portions of the outer walls.

23. The cable routing system of clam 13, wherein said nonstepped-out portions are located at positions above and below said springs.

24. The cable routing system of claim 8, wherein the first and second springs are flexible metal arms that slant across a portion of the pockets.

25. The cable routing system of claim 8, wherein the first and second springs become tensioned after the elements are inserted into the coupling.

26. The cable routing system of claim 8, wherein the first and second springs include projections positioned on the springs to contact the inserted element sidewalls and to resist withdrawal of the inserted elements from the coupling.

27. The cable routing system of claim 26, wherein the projections are sharp or pointed.

28. The cable routing system of claim 26, wherein the projections are cutout tabs.

29. The cable routing system of claim 8, wherein the first and second springs include edges that bitingly engage the inserted element sidewall to resist withdrawal of the element sidewall from the coupling.

30. The cable routing system of claim 29, wherein the edges are defined by cutout tabs.

31. The cable routing system of claim 6, wherein, when the pathway-defining elements are inserted into the coupling, the first and second outer walls extend along a majority of a height of the sidewalls of said elements.

32. The cable routing system of claim 6, wherein the first and second outer walls, including the first and second outer bottom-wall portions, have a continuous U-shaped configuration, and wherein said first and second pockets are U-shaped pockets.

33. The cable routing system of claim 6, wherein the first and second spring means become tensioned after the elements are inserted into the coupling.

34. The cable routing system of claim 6, wherein the first and second outer walls are each continuous.

35. The cable routing system of claim 6, wherein said first and second outer walls include sidewall portions having stepped-out portions adjacent outer surfaces of said first and second spring means and nonstepped-out portions positioned above or below said first and second spring means, the stepped-out portions being spaced from the first and second inner walls a greater distance than said nonstepped-out portions to provide additional pocket space for holding first and second spring means.

36. The cable routing system of claim 35, wherein the stepped-out portions are continuous with the nonstepped-out portions.

37. The cable routing system of claim 35, wherein the stepped-out portions are sized to cover the first and second spring means thereby enclosing the first and second spring means within the first and second pockets.

38. The cable routing system of claim 37, wherein the stepped-out portions are continuous with the nonstepped-out portions.

39. The cable routing system of claim 35, wherein said nonstepped-out portions are located at positions above and below said first and second spring means.

40. The cable routing system of claim 6, wherein the first and second spring means include sharp or pointed projections that resist withdrawal of the inserted elements from the coupling.

41. The cable routing system of claim 40, wherein the projections are cutout tabs.

42. A cable routing system comprising:
a plurality of cable pathway-defining elements;
each one of said elements terminating at at least one attachment end and each of said elements including walls for defining a cable pathway with an upper longitudinal opening through which cables can be added or removed from said cable pathway;
a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;
said alignment means including first and second outer walls and first and second inner walls spaced from said first and second outer walls, respectively, by a distance to define first and second pockets, respectively, sized to receive said first and second sidewalls, respectively, of said elements, said first and second inner and outer walls disposed for said elements to be in said predetermined alignment when said sidewalls are disposed between said outer and inner walls of said coupling; wherein said first and second outer walls are first and second outer sidewalls; and said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between said pathway-defining elements.

43. The cable routing system of claim 42, further including a spacing rib located between the attachment ends when the attachment ends are joined by the coupling, the spacing rib retaining the outer sidewalls and the inner walls in their spaced relation when the attachment ends are joined by the coupling.

44. The cable routing system of claim 43, wherein the first and second spring means are first and second metal spring arms respectively, and wherein the first and second spring arms are biased meaning that the spring arms are in a slanted orientation so that when the element sidewalls are inserted into the pockets the first and second spring arms provide a force against the inserted element sidewalls, and wherein the spring arms are resiliently biased meaning that the spring arms will return toward an original position when no element sidewall is inserted into the pockets.

45. The cable routing system of claim 44, wherein, when in their original position, the first and second spring arms touch the first and second inner walls of the coupling.

46. The cable routing system of claim 45, wherein the first and second spring arms become tensioned after the elements are inserted into the coupling.

47. The cable routing system of claim 44, wherein the alignment means further includes first and second outer bottom walls that are continuous with said first and second outer sidewalls so as to form a continuous generally L-shape.

48. The cable routing system of claim 44, wherein said first and second outer sidewalls include stepped-out portions adjacent outer surfaces of said first and second spring arms and nonstepped-out portions positioned above or below said spring arms, the stepped-out portions being spaced from the first and second inner walls a greater distance than said nonstepped-out portions to provide additional pocket space for holding said first and second spring arms.

49. The cable routing system of claim 48, wherein the stepped-out portions are continuous with the nonstepped-out portions.

50. The cable routing system of claim 48, wherein said stepped-out portions of said outer sidewalls form a spring backing from which the first and second springs extend into the first and second pockets respectively.

51. The cable routing system of claim 50, wherein said first spring arm is a flexible metal arm that slants inwardly into the first pocket from a first end portion of the spring backing, and wherein said second spring arm is a flexible metal arm that slants inwardly into the second pocket from a second end portion of the spring backing.

52. The cable routing system of claim 50, wherein the spring backing includes reinforcing ribs.

53. The cable routing system of claim 52, wherein the reinforcing ribs comprise plastic material.

54. The cable routing system of claim 50, wherein the spring backing includes a top reinforcing rib along a top portion thereof and a bottom reinforcing rib along a bottom portion thereof.

55. The cable routing system of claim 44, wherein the stepped-out portions are sized to cover the first and second spring arms thereby enclosing the first and second spring means in the first and second pockets.

56. The cable routing system of claim 55, wherein the stepped-out portions are continuous with the nonstepped-out portions.

57. The cable routing system of claim 48, wherein said nonstepped-out portions are located at positions above and below said first and second spring arms.

58. The cable routing system of claim 44, wherein the first and second springs arms are flexible metal arms that slant across a portion of the first and second pockets.

59. The cable routing system of claim 44, wherein the spring arms include projections that bite into the inserted element sidewalls to resist withdrawal of the inserted elements from the coupling.

60. The cable routing system of claim 59, wherein the projections are cutout tabs.

61. The cable routing system of claim 42, wherein the first and second inner walls and first and second outer sidewalls include curved portions.

62. The cable routing system of claim 61, wherein the curved portions form corners at a bottom portion of the coupling.

63. The cable routing system of claim 42, wherein, when the pathway-defining elements are inserted into the coupling, the first and second outer walls extend along a majority of a height of the sidewalls of said elements.

64. The cable routing system of claim 42, wherein the first and second pockets are disposed on a right side of the coupling when looking at an end of the coupling along the cable pathway and wherein the coupling defines third and fourth pockets disposed on a left side of the coupling.

65. The cable routing system of claim 42, wherein said first and second outer sidewalls include stepped-out portions adjacent outer surfaces of said first and second spring means and nonstepped-out portions positioned above or below said first and second spring means, the stepped-out portions being spaced from the first and second inner walls a greater distance than said nonstepped-out portions to provide additional pocket space for holding first and second spring means.

66. The cable routing system of claim 65, wherein the stepped-out portions are continuous with the nonstepped-out portions.

67. The cable routing system of claim 65, wherein the coupling includes first and second outer bottom walls spaced from said inner wall to receive therebetween a bottom-wall portion of said elements.

68. The cable routing system of claim 67, wherein the first and second spring means are first and second springs that include projections positioned on the springs to bite into the inserted element sidewalls to resist withdrawal of the inserted elements from the coupling.

69. The cable routing system of claim 68, wherein the projections are cutout tabs.

70. The cable routing system of claim 65, wherein said nonstepped-out portions are located at positions above and below said first and second spring means.

71. The cable routing system of claim 42, wherein the first and second spring means become tensioned after the elements are inserted into the coupling.

72. The cable routing system of claim 42, wherein the first and second spring means are first and second springs respectively, said first spring being a flexible metal arm that slants into the first pocket and said second spring being a flexible metal arm that slants into the second pocket.

73. The cable routing system of claim 72, wherein the first and second springs become tensioned after the elements are inserted into the coupling.

74. The cable routing system of claim 42, wherein the first outer wall is continuous.

75. The cable routing system of claim 74, wherein the second outer wall is continuous.

76. A cable routing system comprising:

a plurality of cable pathway-defining elements, at least one of the cable pathway-defining elements being an extruded trough;

each one of said elements terminating at at least one attachment end and each of said elements including walls for defining a cable pathway with an upper longitudinal opening through which cables can be added or removed from said cable pathway;

a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;

said alignment means including first and second outer walls and first and second inner walls spaced from said first and second outer walls, respectively, by a distance to define first and second pockets, respectively, sized to receive said first and second sidewalls, respectively, of said elements, said first and second inner and outer walls disposed for said elements to be in said predetermined alignment when said sidewalls are disposed between said outer and inner walls of said coupling; and said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between said pathway-defining elements.

77. A cable routing system comprising:

a plurality of cable pathway-defining elements, at least one of the cable pathway-defining elements being a fitting;

each one of said elements terminating at at least one attachment end and each of said elements including walls for defining a cable pathway with an upper longitudinal opening through which cables can be added or removed from said cable pathway;

a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;

said alignment means including first and second outer walls and first and second inner walls spaced from said first and second outer walls, respectively, by a distance to define first and second pockets, respectively, sized to receive said first and second sidewalls, respectively, of said elements, said first and second inner and outer walls disposed for said elements to be in said predetermined alignment when said sidewalls are disposed between said outer and inner walls of said coupling; and said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between said pathway-defining elements.

78. A cable routing system comprising:

a plurality of cable pathway-defining elements;

each one of said elements terminating at at least one attachment end and each of said elements including walls for defining a cable pathway, and wherein at least one of said pathway-defining elements further includes a lid for substantially covering the cable pathway of the at least one element;

a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;

said alignment means including first and second outer walls and first and second inner walls spaced from said first and second outer walls, respectively, by a distance to define first and second pockets, respectively, sized to receive said first and second sidewalls, respectively, of said elements, said first and second inner and outer walls disposed for said elements to be in said predetermined alignment when said sidewalls are disposed between said outer and inner walls of said coupling; and said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between said pathway-defining elements.

79. The cable routing system of claim 78, wherein the lid covers at least a portion of the cable pathway defined by the inner walls of the coupling.

80. The cable routing system of claim 79, wherein the coupling includes a clip that extends upwardly from the first and second outer walls to hold the lid in place.

81. The cable routing system of claim 78, wherein the coupling allows the lid to be removed from the element even when the element is received in the coupling.

82. The cable routing system of claim 78, wherein the first and second spring means are springs that include projections that bite into the inserted element sidewalls to resist withdrawal of the inserted elements from the coupling.

83. The cable routing system of claim 82, wherein the projections are cutout tabs.

84. A cable routing system comprising:
   a plurality of cable pathway-defining elements;
   each one of said elements terminating at at least one attachment end and each of said elements including walls for defining a cable pathway with an upper longitudinal opening through which cables can be added or removed from said cable pathway;
   a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;
   said alignment means including first and second outer walls and first and second inner walls spaced from said first and second outer walls, respectively, by a distance to define first and second pockets, respectively, sized to receive said first and second sidewalls, respectively, of said elements, said first and second inner and outer walls disposed for said elements to be in said predetermined alignment when said sidewalls are disposed between said outer and inner walls of said coupling; and
   said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between said pathway-defining elements, wherein said first and second spring means are respectively flexible arms of a metal piece each arm being set at an angle between the inner and outer walls.

85. The cable routing system of claim 84, wherein the arms of the metal piece are the arms of a leaf spring.

86. The cable routing system of claim 84, wherein the arms of the metal piece are biased meaning the arms are slanted across the first and second pockets so as to push up against the element sidewalls when the element sidewalls are inserted into said first and second pockets.

87. The cable routing system of claim 84, wherein the arms of the metal piece are resilient meaning the arms have a tendency to return toward an original position after the element walls are removed from the first and second pockets.

88. The cable routing system of claim 87, wherein the arms of the metal piece touch the inner walls when in said original position.

89. The cable routing system of claim 84, further including a spacing rib located between the attachment ends when the attachment ends are joined by the coupling, the spacing rib retaining the outer walls and the inner walls in their spaced relation when the attachment ends are joined by the coupling.

90. The cable routing system of claim 89, wherein the first outer wall includes a bottom wall portion and a sidewall portion, and wherein the second outer wall includes a bottom wall portion and a sidewall portion.

91. The cable routing system of claim 89, wherein said metal piece includes first and second halves disposed on opposite sides of said spacing rib.

92. The cable routing system of claim 91, wherein said first and second halves include said flexible arms which define said spring means.

93. The cable routing system of claim 84, wherein the outer walls include stepped-out portions adjacent outer surfaces of said first and second arms and nonstepped-out portions positioned above or below said arms, the stepped-out portions being spaced from the first and second inner walls a greater distance than said nonstepped-out portions so that the pockets vary in width, the first and second arms of the metal piece being enclosed within the first and second pockets by the stepped-out portions of the outer wall.

94. The cable routing system of claim 93, wherein the stepped-out portions of the outer wall are continuous with the nonstepped-out portions of the outer wall.

95. The cable routing system of claim 93, wherein the stepped-out portions are formed by a spring backing from which the arms extend into the pocket.

96. The cable routing system of claim 95, wherein the spring backing includes reinforcing ribs that extend parallel to the cable pathway.

97. The cable routing system of claim 96, wherein the spring backing is plastic.

98. The cable routing system of claim 95, wherein the spring backing is formed continuous with the nonstepped-out portions of the outer wall.

99. The cable routing system of claim 93, wherein said nonstepped-out portions are located at positions above and below said first and second arms.

100. The cable routing system of claim 84, wherein the arms become tensioned after insertion of the element sidewalls into the pockets.

101. The cable routing system of claim 84, wherein the first outer wall includes a bottom wall portion and a sidewall portion, and wherein the second outer wall includes a bottom wall portion and a sidewall portion.

102. The cable routing system of claim 84, wherein the arms of the metal piece touch the inner walls before the element walls are inserted into the pockets.

103. The cable routing system of claim 84, wherein the flexible arms include edges that bite into the inserted element sidewalls to resist withdrawal of the inserted elements from the coupling.

104. The cable routing system of claim 103, wherein the edges are cutout tabs.

105. The cable routing system of claim 103, wherein the edges are sharp or pointed.

106. A cable routing system comprising:
   a plurality of cable pathway-defining elements;
   each one of said elements terminating at at least one attachment end and each of said elements including walls for defining a cable pathway with an upper longitudinal opening through which cables can be added or removed from said cable pathway;

a coupling for joining at least a first one of said attachment ends to at least a second one of said attachment ends, said coupling including wall means for defining a coupling pathway and aligning means for aligning the first and second ones in a predetermined alignment with said cable pathway aligned with said coupling pathway, said elements including at least first and second sidewalls, said coupling further including clamp means for automatically clamping an attachment end when in said predetermined alignment;

said alignment means including first and second outer walls and first and second inner walls spaced from said first and second outer walls, respectively, by a distance to define first and second pockets, respectively, sized to receive said first and second sidewalls, respectively, of said elements, said first and second inner and outer walls disposed for said elements to be in said predetermined alignment when said sidewalls are disposed between said outer and inner walls of said coupling; and said clamp means includes first and second resiliently biased spring means carried on said coupling and disposed within said first and second pockets, respectively, and directed to urge an element wall against a wall of said coupling upon insertion of said element wall between said outer and inner walls, said inner walls sized to cover said clamp means and shield said clamp means from said coupling pathway with said first and second inner walls cooperating with said element wall to define a generally continuous closed wall between said pathway-defining elements, wherein said first and second spring means are springs directed to urge an inserted element wall toward said first and second inner walls of said coupling.

107. The cable routing system of claim 106, wherein the springs are biased meaning the springs are slanted across the first and second pockets in the direction of insertion so as to push up against the element sidewalls when the element sidewalls are inserted into said first and second pockets.

108. The cable routing system of claim 106, wherein said first and second springs are respectively flexible arms of a metal piece, each arm being set at an angle between the inner and outer walls, and wherein the arms of the metal spring are resilient meaning the arms have a tendency to return toward an original position after the element walls are removed from the first and second pockets.

109. The cable routing system of claim 108, wherein the springs touch the inner walls when in said original position.

110. The cable routing system of claim 106, further including a spacing rib located between the attachment ends when the attachment ends are joined by the coupling, the spacing rib retaining the outer walls and the inner walls in their spaced relation when the attachment ends are joined by the coupling.

111. The cable routing system of claim 110, wherein the first outer wall includes a bottom wall portion and a sidewall portion, and wherein the second outer wall includes a bottom wall portion and a sidewall portion.

112. The cable routing system of claim 106, wherein the outer walls include stepped-out portions adjacent outer surfaces of said first and second springs and nonstepped-out portions positioned above or below said springs, the stepped-out portions being spaced from the first and second inner walls a greater distance than said non-stepped-out portions so that the pockets vary in width, the springs being enclosed within the first and second pockets by the stepped-out portions of the outer wall.

113. The cable routing system of claim 112, wherein the stepped-out portions of the outer walls are continuous with the nonstepped-out portions of the outer walls.

114. The cable routing system of claim 112, wherein the stepped-out portions are formed by a spring backing from which the springs extend into the pocket.

115. The cable routing system of claim 114, wherein the spring backing includes reinforcing ribs that extend parallel to the cable pathway.

116. The cable routing system of claim 114, wherein the spring backing is plastic.

117. The cable routing system of claim 114, wherein the spring backing is formed continuous with the nonstepped-out portions of the outer wall.

118. The cable routing system of claim 112, wherein said nonstepped-out portions are located at positions above and below said springs.

119. The cable routing system of claim 106, wherein the springs become tensioned after insertion of the element walls into the pockets.

120. The cable routing system of claim 106, wherein the first outer wall includes a bottom wall portion and a sidewall portion, and wherein the second outer wall includes a bottom wall portion and a sidewall portion.

121. The cable routing system of claim 120, wherein the sidewall portion of the first outer wall is continuous with the bottom wall portion of the first outer wall.

122. The cable routing system of claim 120, wherein the sidewall portion of the first outer wall is a continuous plastic wall.

123. The cable routing system of claim 120, wherein the sidewall portion of the first outer wall is continuous along a majority of a height of the element sidewall.

124. The cable routing system of claim 106, wherein the springs touch the inner walls before the element sidewalls are inserted into the pockets.

125. The cable routing system of claim 106, wherein the springs include edges that bite into the inserted element sidewalls to resist withdrawal of the inserted elements from the coupling.

126. The cable routing system of claim 125, wherein the edges are defined by cutout tabs.

127. The cable routing system of claim 126, wherein the edges are sharp or pointed.

* * * * *